United States Patent [19]
Gadbois

[11] 3,918,815
[45] Nov. 11, 1975

[54] DENSITOMETER FOR MEASURING AVERAGE APERTURE DIAMETER

[75] Inventor: George Simon Gadbois, Lancaster, Pa.

[73] Assignee: RCA Corporation, New York, N.Y.

[22] Filed: Aug. 5, 1974

[21] Appl. No.: 495,067

[52] U.S. Cl. ............... 356/157; 250/559; 356/206
[51] Int. Cl.² ..................................... G01B 11/28
[58] Field of Search .......... 356/157, 158, 159, 168, 356/201, 205, 206; 250/559, 560, 571

[56] References Cited
UNITED STATES PATENTS
| | | | |
|---|---|---|---|
| 3,636,362 | 1/1972 | Beeman et al. | 356/168 |
| 3,645,634 | 2/1972 | Bucher | 356/201 |

*Primary Examiner*—Vincent P. McGraw
*Attorney, Agent, or Firm*—Edward J. Norton; William Squire

[57] ABSTRACT

A densitometer comprises first and second photocells for producing a signal representing the transmission of light through an apertured member. A settable reference signal source provides a signal representing the spacing of the apertures. The logarithm of the transmission and aperture spacing signals are determined. Means are provided for dividing the transmission logarithm signal by two, summing the spacing and divided logarithm signals and taking the antilog of the resultant signal. Digital display means display a digital reading of the value of the antilog of the resultant signal, giving a direct reading of average aperture diameter.

13 Claims, 3 Drawing Figures

DENSITOMETER FOR MEASURING AVERAGE APERTURE DIAMETER

BACKGROUND OF THE INVENTION

1. Field of the Invention

The present invention relates to apparatus for measuring light transmission through an apertured member such as an aperture mask for a color television picture tube.

2. Description of the Prior Art

Prior art densitometers for measuring light transmission through an apertured member are of the type including a light source for producing a light beam, a beam splitter for dividing the beam into a measuring beam and a reference beam, a measuring photocell positioned in the path of the measuring beam to provide a measured signal, and a reference photocell.

The apertured member is arranged to be positioned in the path of the measuring beam between the beam splitter and the measuring photocell. Means are included for comparing the reference signal and the measured signal to produce an output signal.

The output signal is produced by circuitry which balances impedances in a bridge configuration. This balancing configuration is cumbersome to implement and maintain. In a procedure to calibrate such an instrument, several standard apertured members are applied to the densitometer to provide an output signal corresponding to this standard. Since hole sizes may vary in the apertured member under measurement anywhere within a given range, the standards only represent finite points within that given range. Therefore, a computation known as a regression analysis is performed on the output signals corresponding to the standard apertured members to provide a theoretical curve which is fitted to the standard points represented by the standard member output signals. However, these computations and the variations of the apparatus itself in a day-to-day application provide variations in the standard output signals such that different curves not exactly coinciding may be produced which also are not generally linear throughout the desired range. As a result, there is a deviation of tolerance for any given diameter of an aperture being measured.

These computed curves are then used to provide calibrated gauges which are affixed to a variable potentiometer knob on a balancing bridge network. The network balances the output signal produced by the reference cell with the signal passed through the apertured member whose aperture diameter is being measured. When a null is reached, it is assumed that the diameter of the aperture being measured matches the calibrated aperture size on the computed curve which has been matched to various dial readings on the balancing potentiometer knob.

Should the standard in some way become clogged with dust particles not readily visible to an operator, then it is apparent that the matching of the member whose apertures are being measured with that standard will produce an erroneous reading. This requires comparison of the standard with a second standard of like aperture size or cumbersome remeasurement of the standard.

Further, the measuring apparatus includes an adjustably slideable casing and adjustment knob for adjusting the position of the reference photocell. This also requires tedious calibration and reinspection to ensure calibration has not deviated from its original setting.

SUMMARY OF THE INVENTION

A densitometer comprises means for comparing the intensity of a standard light beam to the intensity of the beam when transmitted through a plurality of apertures in an apertured member and comparing means for producing an output signal representing the relative intensity of the compared beams. Means are included for providing a reference signal representing the spacing of adjacent apertures in the member. Signal processing means are provided which are responsive to the compared light beams output signal and the reference signal applied as inputs thereto for providing as an output therefrom a signal whose magnitude is a function of the average diameter of the plurality of apertures in accordance with the relationship $$h_b = k_a \left( \frac{t_{meas}}{s_{ref}} \right)^{1/2}$$

where $h_b$ is the output signal of the processing means, $k_a$ is the reference signal, $s_{ref}$ represents the intensity of the standard light beam and $t_{meas}$ represents the intensity of the transmitted light beam.

IN THE DRAWINGS

FIG. 1 is a partial elevational sectional view of a densitometer constructed in accordance with an embodiment of the present invention and including a block diagram of the electrical circuitry connected therewith, FIG. 2 is a fragmented plan view of an apertured member useful in explaining the present invention, and FIG. 3 is a schematic illustration of a circuit constructed in accordance with an embodiment of the present invention.

DESCRIPTION OF THE PREFERRED EMBODIMENT

Figure 1:
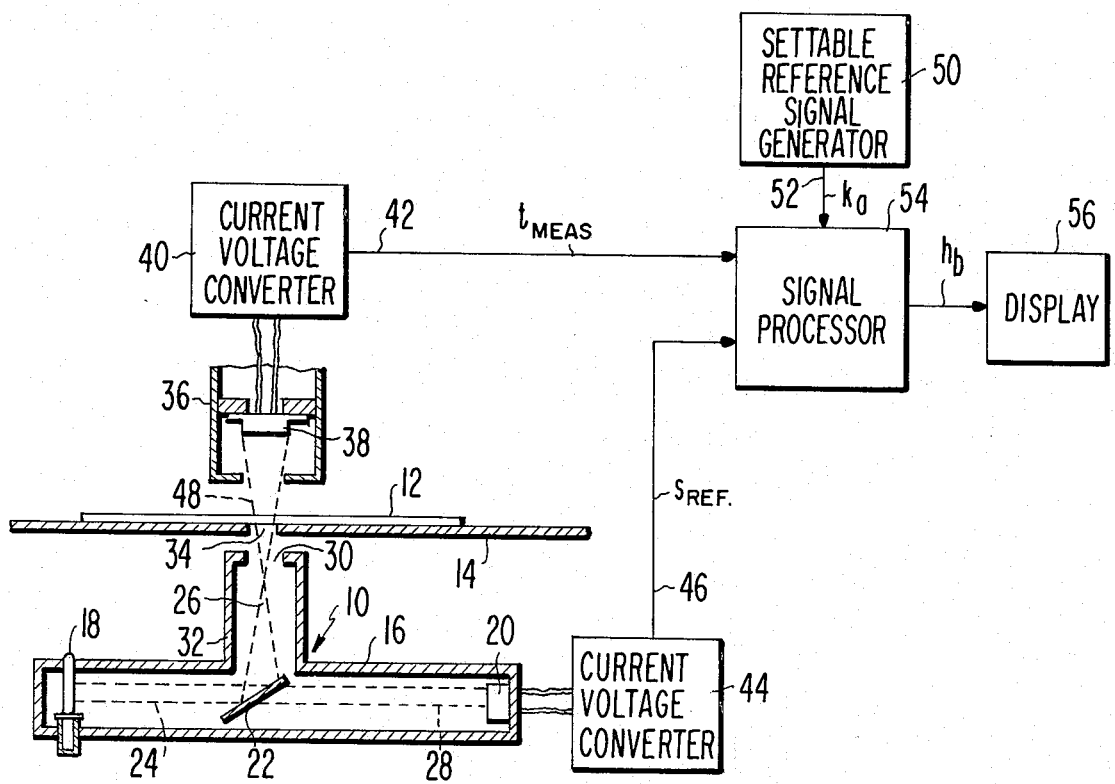
Figure 2:
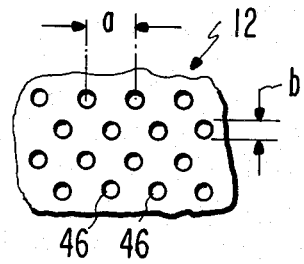

In FIG. 1, densitometer 10 is an apparatus similar to the apparatus described in U.S. Pat. No. 3,645,634 which is incorporated by reference herein. The densitometer 10 is arranged to support a color television picture tube aperture mask 12 a portion of which is illustrated in FIG. 2.

Densitometer 10 of FIG. 1 includes a table 14 for supporting the aperture mask 12 in a manner described in the above-noted patent. Densitometer 10 also includes a T-shaped housing 16 which has disposed at one end of the horizontal bar portion a suitable light source 18 and at the opposite end a suitable photocell 20 preferably of the silicon type which is not subject to shock when exposed directly to the beam of light from source 18. Disposed between light source 18 and reference photocell 20 is a beam splitting mirror 22. Mirror 22 splits the light beam 24 from source 18 into a reflected measuring beam 26 and a transmitted reference beam 28. Suitable optics, not shown, form light beam 24. Photocell 20 is disposed in a fixed position to receive the beam 28. It should be noted that the adjustable photocell mounting assembly 40 in U.S. Pat. No. 3,645,634 is fixed in the present arrangement with respect to source 18 in accordance with an embodiment of the present invention.

A measuring beam exit window 30 is positioned at the upper end of the upstanding enclosure portion 32 of the T-shaped housing 16. Table 14 has a hole 34 and is positioned with hole 34 disposed such that beam 26 passes therethrough. Measuring photocell mounting assembly 36 includes a measuring photocell 38 mounted therein positoned to receive the measuring beam 48 passed through the apertures of aperture mask 12. Suitable mounting arrangements and other details are omitted in the FIG. 1 arrangement for purposes of illustration. Such details are further disclosed by way of example in U.S. Pat. No. 3,645,634.

The output of photocell 38 is applied to a current-to-voltage converter 40 which produces an output signal $t_{meas}$ on lead 42. Reference photocell 20 applies its output to a current-to-voltage converter 44 which is substantially the same type of circuit as converter 40. Converter 44 applies an output signal $s_{ref}$ on lead 46.

Prior to further discussing the apparatus of FIG. 1, a brief description of the aperture mask 12 will be helpful. In FIG. 2, aperture mask 12 has a plurality of apertures or holes 46 which are spaced a uniform spacing $a$ with respect to the next adjacent holes 46. Holes 46 ideally should have identical diameters $b$. In producing the aperture mask 12 the hole spacing $a$ is by the nature of the manufacturing process fixed for a given aperture mask 12. There is a negligible variation of the spacing $a$ from one aperture mask to another. However, the holes 46 are produced by a process wherein the hole size or diameter $b$ may vary substantially among the different holes. Therefore, it is extremely important to be able to ascertain the average diameter $b$ of the apertures 46 in a given aperture mask.

In an article entitled "A Three-Gun Shadow-Mask Color Kinescope" by H. B. Law, Vol. 39, Proceedings of the I. R. E., October 1951, there is described a shadow-mask of the type illustrated in FIG. 2. On page 1190 of this article is given the relationship of the area of apertures 46 of diameter $b$ to the total area defined by a diameter corresponding to hole spacing $a$. This relationship will hereinafter be referred to as the transmission of the aperture mask 12 designated as $t_{mo}$ which is a per cent transmission. On page 1190 the transmission is given as follows:

$$(1) \qquad t_{mo} = \frac{\pi b^2}{2a^2} \sqrt{3}.$$

(Note that the $a^2$ term in the article reads $a^3$ which is a typographical error in the article). Equation (1) when reduced reads as follows:

$$(2) \qquad t_{mo} = .9069 \frac{b^2}{a^2}.$$

Rearranging we find that $$(3) \qquad b = 1.05a \left( \sqrt{t_{mo}} \right).$$

This relationship has particular significance to the apparatus constructed in accordance with the present invention.

As provided by the apparatus of the present invention, the intensity of the light beam 48 passed by aperture mask 12 of FIG. 1 corresponds directly to the per cent transmission of the aperture mask 12. Therefore, the output signal $t_{meas}$ of the measuring photocell 38 and current-to-voltage converter 40 is the signal that corresponds to the per cent transmission of aperture mask 12.

The output of reference photocell 20 and converter 44, being produced by the same light source 18 as the output of measuring photocell 38, has an output signal $s_{ref}$ whose intensity varies directly with any variations in intensity of light source 18. Therefore, any variations in the signal $t_{meas}$ due to variations in intensity of the light source 18 can be eliminated by the comparison of the signal $t_{meas}$ with the signal $s_{ref}$. The relative difference in intensity between these two signals provides an absolute signal whose variations correspond directly to the variations of the per cent transmission manifested by the intensity of measuring light beam 48.

As provided in accordance with the present invention, means are provided for operating upon the outputs of photocells 38 and 20 representing the per cent transmission $t_{mo}$ intensity of beam 48. These means provide a signal corresponding to the term $1.05a$ in equation 3 above and operate upon these two terms, $1.05a$ and $t_{mo}$. This is achieved by a calculation in accordance with equation 3 to provide an output signal $h_b$ representing the solution to the equation 3 wherein the signal $h_b$ corresponds to the value of ($b$). The output signal $h_b$ corresponds directly in magnitude to the value of the hole 46 diameter ($b$). By converting the signal $h_b$ to a digital display format, a direct reading hole size instrument is provided in a simple and economical manner.

Accordingly, a settable reference signal generator 50 of FIG. 1 produces a signal $k_a$ on output lead 52. The signal $k_a$ represents the term $1.05a$ in equation 3 above. Leads 42, 46 and 52 are coupled to signal processor 54 which performs the necessary computations on signals $k_a$, $t_{meas}$ and $s_{ref}$ in accordance with equation 3. The output of signal processor 54 is signal $h_b$ representing the average diameter $b$ of the apertures 46 disposed within beam 48. Processor 54 takes the square root of the ratio of signals $t_{meas}$ and $s_{ref}$ and the resultant signal is multiplied times the signal $k_a$. The output of signal processor 54, signal $h_b$, is applied to a suitable display 56 which is a commercially available digital panel display apparatus. Display 56 includes an analog-to-digital converter and a digital display device which provides a digital display of the magnitude of the analog signal applied as an input thereto.

Figure 3:
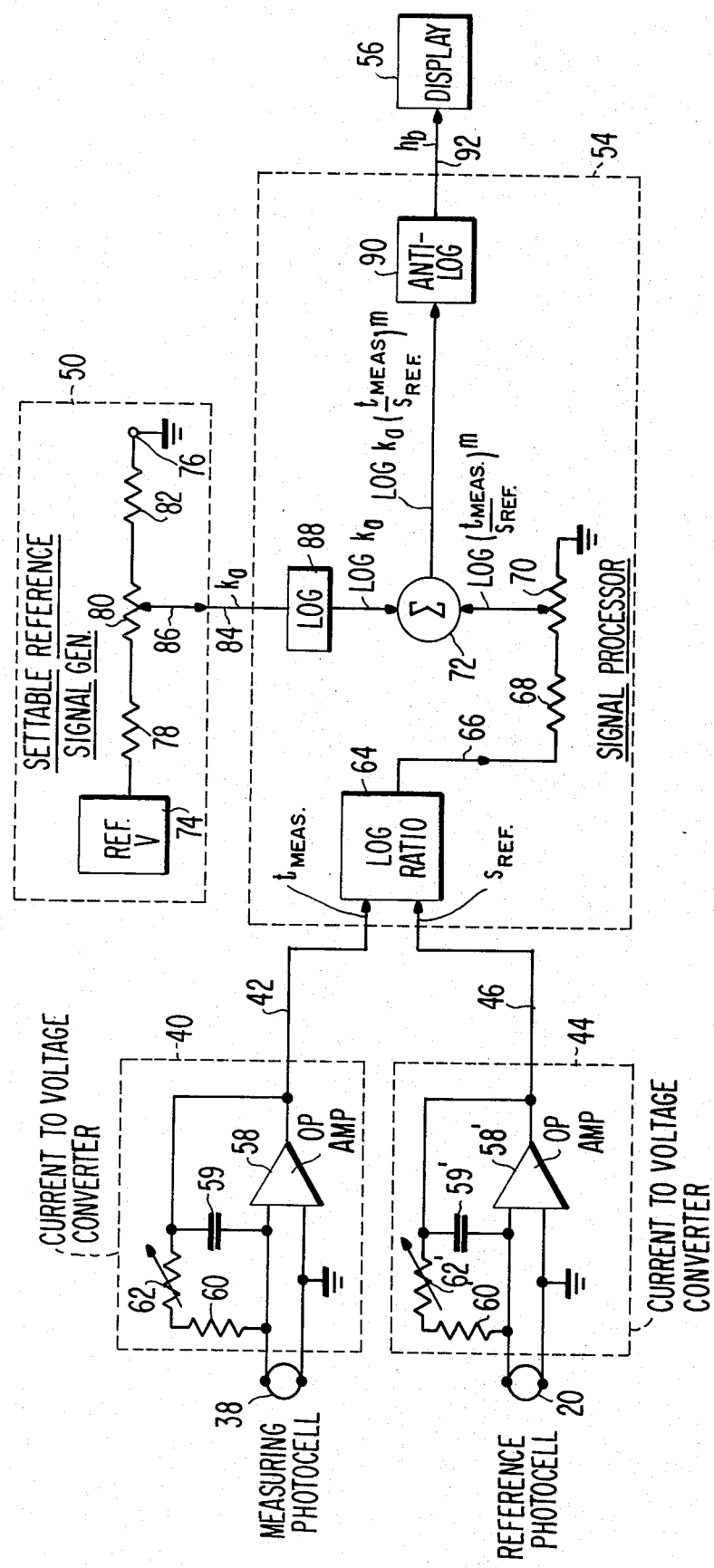

Reference is now made to FIG. 3 which illustrates an embodiment of the signal processor 54, converters 40 and 44 and generator 50. In FIG. 3, converters 40 and 44 are substantially the same and therefore a description of only one will be provided. The same numbers with and without the primes refer to the same parts in converters 40 and 44. Converter 40 comprises an operation amplifier 58 and filtering capacitor 59 in parallel with serially connected resistances 60 and 62 connected between the output and the inverting input of amplifier 58. The non-inverting input of amplifier 58 is connected to a point of reference potential such as ground.

Resistances 60 and 62 determine the gain of the amplifier. Resistance 62 is variable for adjusting the output voltage on lead 42 within a desired range suitable for use with the signal processor 54. Capacitor 59 serves as a low pass filter for filtering out instantaneous changes in intensity in the light source.

The converter 40 output signal $t_{meas}$ on lead 42 is a signal whose voltage amplitude represents the intensity of the light received by measuring photocell 38. In a similar manner, the voltage amplitude of the signal on lead 46 from converter 44, signal $s_{ref}$, represents the intensity of the light received from source 18 by reference photocell 20.

Leads 42 and 46 are connected to the input of log ratio device 64 which forms a part of signal processor 54. Device 64 takes the logarithm of the ratio of the value of the amplitude of signal $t_{meas}$ with respect to the value of the amplitude of the signal $s_{ref}$. The output of device 64 is applied to lead 66 through serially connected resistance 68 and variable resistance 70 to summation device 72. Resistances 68 and 70 determine the value of the exponent $m$ the power to which the ratio $$\frac{t_{meas}}{s_{ref}}$$

is raised. In the present case, as indicated in equation 3, since the power to which the value of $t_{mo}$ is raised is one-half then the value of $m$ is one-half. Thus the signal applied to the device 72 through resistance 70 represents the log of the ratio $$\frac{t_{meas}}{s_{ref}}$$

raised to the one-half power.

Signal reference generator 50 includes a source of a reference potential 74 whose output is connected to a reference potential such as ground at terminal 76 through voltage dividing resistors 78, 80 and 82. Resistance 80 is connected to the output lead 84 of generator 50 by way of wiper arm 86 which sets the value of signal $k_a$ appearing on lead 84 in accordance with the position of the wiper arm 86. Signal $k_a$ has an amplitude representing the hole spacing $a$ term in equation (3), namely, $1.05a$. How the value of this signal is set will be explained later.

Lead 84 is connected to signal processor 54 summation device 72 through logarithm device 88 which takes the logarithm of the value of the amplitude of signal $k_a$. Device 72 takes the sum of the two signals, the logarithm of signal $k_a$ and the logarithm of the ratio of signals $$\frac{t_{meas}}{s_{ref}}$$

raised to the one-half power. The output of summation device 72 is a signal log $k_a$ $$\frac{t_{meas}}{s_{ref}}$$

raised to the $m$ power, where $m$ is one-half. This signal is applied as an input to an antilog device 90 which provides a signal whose amplitude represents the antilog of the signal applied to the input thereof. The output signal $h_b$ of antilog device 90 is applied along lead 92 to suitable analog-to-digital converter and digital display device 56.

Log ratio device 64, antilog device 90, logarithm device 88, summation device 72 and reference voltage source 74 are commercially available devices. Such devices are manufactured in a single multifunctional module model number 433J manufactured by Analog Devices, Inc. of Norwood, Mass. A description of that device is provided in a catalog C125-10 dated May 1972 and published by Analog Devices, Inc.

In operation, the outputs of converters 40 and 44 are adjusted so as to be similar. This can be accomplished by suitable display means such as display 56 coupled directly to leads 42 and 46 by means not shown. These outputs should be the same with no masks in the light paths between the light source 18 of FIG. 1 and photocells 20 and 38. The commercially available circuit for signal processor 54 identified above herein is responsive to voltage inputs along leads 42 and 46 having a value in the range of 0 to 10 volts. For this device, the outputs of converters 40 and 44 should be the same approximately within 0.1 volts. The matching of the outputs on the two converters is not critical. The output of converters 40 and 44 are adjusted by adjusting resistances 62 and 62', respectively, wherein the prime number in converter 44 corresponds to the same unprimed number in converter 40. With no mask 12 in place, the signal $t_{meas}$ and $t_{ref}$ are matched. The relative ratio of the input signals $t_{meas}$ and $s_{ref}$ being applied as inputs to log ratio device 64 represents the transmission of light through mask 12.

A standard aperture mask 12 whose hole size $b$ is predetermined by precise measurements in a measuring microscope or the like is inserted in the path of beam 34 producing the measuring beam 48. As a result, the signal appearing on device 64 output lead 66 will have an amplitude which is proportional to the transmission of light passed by the standard mask 12. The first standard mask selected is one in which the hole size $b$ is a maximum of a predetermined range of hole sizes present in a set of masks to be examined.

The wiper arm 86 in settable reference signal generator 50 is adjusted such that the display 56 provides a digital output reading of the hole size of that standard.

Previously the wiper arm of variable resistance 70 has been set to divide the amplitude of the signal on lead 66 to provide the exponent $m$ at a value of about one-half thus taking the square root of the value of the signal appearing on lead 66. To so set resistance 70 is within the skill of the art.

By adjusting the wiper arm 86 of resistance 80 of signal generator 50, the value of the factor $k_a$ is adjusted so as to represent the value of $1.05a$ in equation 3 above. This is set merely by observing the reading on display 56 and adjusting arm 86 such that the display reading corresponds to the standard hole diameter $b$ being measured.

The scale and slope of the straight line curve representing a given range of hole sizes is now established in the apparatus. To adjust the curve slope, a standard mask representing the minimum hole size is now inserted in the apparatus 10 of FIG. 1. If the display on display 56 differs from the actual hole size in the minimum hole size standard, exponent $m$ setting resistance 70 is adjusted so as to cause display 56 to display a hole size reading matching the hole size standard.

To adjust scale, the maximum hole size standard is reinserted in apparatus 10 and a new display reading taken on display 56. Should this reading not match the standard, resistance 80 is adjusted accordingly. This is repeated until accurate readings are displayed at both ends of the range. Thus, the maximum and minimum standards in a range of hole sizes expected to appear in the various masks 12 to be inspected are alternately reinserted in apparatus 10 to adjust the respective slope and scale of the curve defined by these two standards. The minimum hole size standard is preferably associated with the exponent setting resistance 70 in the interest of obtaining maximum resolution in the adjustment.

In this manner a direct reading of hole sizes is provided on display 56 which will give an accurate reading within an allowable tolerance of less than 0.1 mil in the sizes of holes 46 having a magnitude of about 9 mils in an actual unit constructed in accordance with the present invention.

Should the mask 12 be the type whose spacing $a$ differs from the standard originally set up, as described above, then the wiper arm 86 of resistance 80, FIG. 3, is adjusted so as to provide a correct reading on display 56 of the diameter $b$ of holes 46 for that mask. Further, should differences occur in the reading of the standard due to drifting, optics, variations in the light source and so forth, the wiper arm 86 of resistance 80 is adjusted so as to vary the value of the signal $k_a$ on lead 84. For a given range of hole sizes the resistance 70 need not be further adjusted.

As noted above, the output signals $t_{meas}$ and $s_{ref}$ on leads 42 and 46 of converters 40 and 44, respectively, if not matched exactly can be compensated for by adjustment of the value of resistance 80 through wiper arm 86. Using a conventional digital panel meter for display 56 in an apparatus constructed in accordance with the present invention, a range of hole diameters of 8 to 14 mils and a range of mask transmissions varying in a range of 6 to 27 per cent were measured without affecting the initial set up conditions of the apparatus of FIG. 3.

There has thus been described an apparatus which provides a direct digital output reading of the average diameter of holes in an apertured mask or membrane as used in a color television picture tube. Once the apparatus is set up to read hole size within a given range of hole sizes, the display provides a direct reading of average hole size for any mask whose hole size varies within that range. No further adjustments are required or necessary in the apparatus. Further, the actual direct reading provided by the display presents to an operator means for immediately correcting any deviations that may occur in a standard mask.

It is general practice to have a standard mask sample in place on the densitometer such that the standard is measured whenever the operator is changing unknown samples Because of the direct reading available from the display, the operator's attention is called to any calibration error at the end of each apparatus measurement cycle.

What is claimed is:

1. In an apparatus for producing a signal manifesting the average aperture diameter of an apertured member by the measurement of light transmission through said member, said apparatus including:
   a. means for producing a light beam,
   b. means for dividing said beam into a measuring beam and a reference beam,
   c. a reference photocell disposed to receive said reference beam for producing a reference signal $s_{ref}$,
   d. a measuring photocell disposed to receive said measuring beam passed through a plurality of said apertures in said member for producing a measuring signal $t_{meas}$ manifesting the intensity of said passed measuring beam, the combination therewith comprising:
   means for providing a settable reference signal $k_a$ representing the spacing of said plurality of apertures, and
   signal processing means responsive to said reference signal $s_{ref}$, measuring signal $t_{meas}$ and said settable reference signal $k_a$ applied as inputs thereto for providing as an output therefrom a signal $h_b$ manifesting the average diameter of said plurality of apertures in accordance with the relationship $$h_b = k_a \left( \frac{t_{meas}}{s_{ref}} \right)^{\frac{1}{2}}.$$

2. The apparatus of claim 1 further including digital display means responsive to said output signal $h_b$ applied as an input thereto for producing a digital display of said average aperture diameter.

3. The apparatus of claim 1 wherein said signal processing means includes:
   means responsive to said reference signal $s_{ref}$ and said measuring signal $t_{meas}$ applied as inputs thereto for providing as an output therefrom a signal representing the logarithm of the ratio of one of said signals $t_{meas}$ and $s_{ref}$ to the other of said signals $t_{meas}$ and $s_{ref}$,
   means responsive to said ratio signal applied as an input thereto for producing as an output therefrom a first signal representing said logarithm ratio signal divided by about two,
   means responsive to said settable reference signal $k_a$ applied as an input thereto for providing as an output therefrom a second signal representing the logarithm of said settable reference signal $k_a$,
   means responsive to said first and second signals applied as inputs thereto for providing as an output therefrom a third signal representing the sum of said first and second signals, and
   means for taking the antilogarithm of said third signal applied as an input thereto to thereby produce said signal $h_b$.

4. The apparatus of claim 3 further including display means responsive to said signal $h_b$ for providing a digital display of the magnitude of said average aperture diameter.

5. The apparatus of claim 3 wherein said reference and measuring photocells produce currents representing the magnitude of said reference signal $s_{ref}$ and measuring signal $t_{meas}$, respectively, said apparatus further including means for converting said currents into respective voltages whose magnitudes represent the respective magnitudes of said signals $s_{ref}$ and $t_{meas}$.

6. The apparatus of claim 5 wherein said converting means include respective corresponding operational amplifiers.

7. The apparatus of claim 3 wherein said first signal producing means includes settable voltage divider means.

8. The apparatus of claim 1 wherein said member is an aperture mask used in a color television picture tube.

9. The apparatus of claim 1 including securing means for securing said reference cell in fixed positional relationship with respect to the position of said light beam producing means.

10. The apparatus of claim 1 wherein said reference cell is exposed directly to said reference beam.

11. In combination:
a light source,
a first photocell arranged to receive light from said source for producing an output signal in response to said received light manifesting the intensity of said received light,
a second photocell arranged to receive a beam of light from said source for producing an output signal in response to said received beam manifesting the intensity of the light received thereby,
means arranged for disposing an apertured member between said second photocell and said light source, the portion of said member intercepting said beam of light having a given area transverse said beam, the aperture in said member having a given area transverse said beam less than said portion area,
means for providing a reference signal manifesting said portion given area, and
signal processing means responsive to said first and second photocell output signals and said reference signal applied as inputs thereto for producing as an output signal therefrom a signal representing the diameter of said aperture, wherein the relationship of said processing means output signal to said photocell output signals and said reference signal is $$h_b = k_a \left( \frac{t_{meas}}{s_{ref}} \right)^{1/2}$$

where $h_b$ is said signal processing means output signal, $k_a$ is said reference signal, $s_{ref}$ is said first photocell output signal and $t_{meas}$ is said second photocell output signal.

12. A densitometer for providing a measuring signal representing the value of the diameter of an aperture in a light opaque member comprising:
means for taking the ratio of the intensity of a light beam received from a source to the intensity of a light beam received from said source transmitted through said aperture to produce as an output signal therefrom a signal representing said compared light intensities,
means for providing a reference signal representing a given area of said member transverse said transmitted beam greater than the area of said aperture transverse said transmitted beam,
means responsive to said output signal for producing a signal representing the square root of the value of said output signal, and
multiplying means responsive to said square root produced signal and said reference signal applied as inputs thereto for multiplying said produced square root signal and said reference signal generating said measuring signal as an output therefrom.

13. A densitometer comprising:
means for comparing the intensity of a standard light beam to the intensity of said beam when transmitted through a plurality of apertures in an apertured member, said comparing means producing an output signal representing the relative intensity of said compared beams,
means for providing a reference signal representing the spacing of adjacent apertures in said member, and
means responsive to said compared light beam output signal and said reference signal applied as inputs thereto for providing as an output therefrom a signal whose magnitude is a function of the average diameter of said plurality of apertures in accordance with the relationship $$h_b = k_a \left( \frac{t_{meas}}{s_{ref}} \right)^{1/2}$$

where $h_b$ is the output signal of said computing means, $k_a$ is said reference signal, $s_{ref}$ represents the intensity of said standard light beam and $t_{meas}$ represents the intensity of said transmitted light beam.

* * * * *